United States Patent Office 3,000,840
Patented Sept. 19, 1961

3,000,840
DISPERSING AGENTS
John H. Johnson and Joseph E. Fields, Dayton, Ohio, assignors to Monsanto Chemical Company, St. Louis, Mo., a corporation of Delaware
No Drawing. Filed Dec. 20, 1957, Ser. No. 704,003
2 Claims. (Cl. 260—8)

The present invention relates to coating compositions and more particularly provides new and valuable water-base coatings. The invention more specifically provides coatings which comprise aqueous dispersions of substantially water-insoluble pigments in admixture with an organic film-forming material. The invention further provides an improved step in the manufacture of said water-base coatings which comprises dispersing the pigment in water in the presence of certain polymeric materials as dispersing agents. An important feature of the invention is the process of coating paper with the presently provided coatings and the provision of coated papers thereby obtained.

Water-base coatings generally comprise suspensions of one or more mineral pigments in water and a binding agent which is an organic film-forming material. The pigment serves to give opacity and color to the finish. In paper technology, the pigment also provides a receptive surface for printing. Upon drying of the coating, the binding agent, being a film-forming material, not only serves to bind the pigment particles to each other and to the surface to which the coating has been applied, but it also provides the hard film which is a requisite of all coated finishes.

Pigments which are generally employed in the formulation of water-base coatings are substantially water-insoluble inorganic products such as kaolin, calcium carbonate, barium sulfate, lithopone, zinc sulfide, cadmium sulfide, titanium dioxide, ferric oxide, lead chromate, carbon black, etc. In paper coatings, of course, those pigments which mask paper stock of poor color and give a white, opaque surface of the desired degree of gloss are desirable. Kaolin, a clay which is particularly suitable as a pigment constituent of paper-coatings as well as of water-base coatings suitable for application to plaster, masonry, wood and other cellulosic materials of construction is most extensively used not only because of economic considerations but also because of the good hiding power or opacity, gloss and brightness of the finishes produced therefrom. Titanium dioxide which probably has a much greater opacifying and brightening power than any other white pigment is rarely used as the sole pigment constituent because of its cost. Since only small amounts of titanium pigment are usually needed to produce brightness and opacity, it is frequently incorporated with the less expensive pigments. Generally, an amount of from 5% to 25% by weight of the composite pigment gives good results.

The quantity of organic, film-forming binding agent or adhesive, a necessary but expensive accompaniment to the pigment, is generally kept as low as possible without sacrificing bonding and finish property. Depending upon the character of the binding agent, pigment and nature of the surface to which the coating is to be applied, and type of finish required, generally the binding agent comprises from 10% to 35% of the solids weight. Binding agents commonly employed in the formulation of water base coatings are, e.g., casein, modified starch, soya portein, gelatin and glue, carboxymethylcellulose, polyvinyl alcohol, other water-soluble synthetic resins, synthetic rubber latices, etc.

The coating compositions are generally prepared by first dispersing the inorganic pigment in water and mixing the resulting dispersion with the binding agent which is generally in water-solution. Proper dispersion of the pigment is of extreme importance in formulation of the coating; otherwise a smooth uniform finish cannot be obtained. Generally the pigment is first mixed with water to form a stiff paste, either in the presence or absence of a dispersing agent. Before additional water is added, however, a dispersing agent is commonly added. If the initial mixing has been done in the absence of said agent, addition thereof usually causes the paste to become more fluid even without introduction of more water. When very fine dispersion of the pigment in the required quantity of water has been achieved, the solution (or a suspension) of the binding agent is added very gradually to the dispersion, with thorough mixing. The total solids content (i.e., pigment plus binding agent) is generally of the order of from 20% to 70% of the aqueous coating when ready for use. It is common practice, however, to market an aqueous paste comprising the pigment, dispersing agent and binding agent. Additional water in a quantity to give a free-flowing coating is added by the consumer.

From the above it is evident that the degree of dispersion of the pigment has a strong influence on the quality of coating obtained. The rheological properties of the coating, its covering power, uniformity and permanence are all functions of the degree of pigment dispersion obtained and hence of the dispersing agent used.

Materials used in the prior art for dispersing pigments have been many and varied and have included, for example, naphthalene sulfonates, proteins, lignin sulfonates, fatty alkyl sulfates and quaternary ammonium compounds. It has now been discovered that aliphatic olefin-maleic anhydride copolymers having a molecular weight of from 600 to 130,000 and preferably less than 13,000 and their ammonium salts and amides are particularly effective dispersing agents for inorganic pigments. The presently useful copolymers are characterized as products which by their presence act to prevent flocculation or agglomeration of solid particles of pigment suspended in water. In contrast to the compounds so employed in the prior art, smaller amounts of the presently employed low molecular weight copolymers are required to promote a comparable degree of dispersion in inorganic pigments. With most dispersants, further addition after maximum thinning has been attained is characterized by an immediate increase in viscosity. This is not the case, however, with the thinners of the present invention. The latter are more desirable than those of the prior art since they maintain a constant low level of viscosity over a much wider solids concentration range. They thus have the advantage of permitting the preparation of suspensions of much higher solids concentration per given quantity of dispersing agent.

In accordance with the invention, the dispersion of an inorganic pigment suspended in an aqueous medium may be readily effected by incorporating in said suspension a small quantity of low molecular weight aliphatic olefin-maleic anhydride copolymer or its salts and amides. Consequently, the invention is also considered as encompassing a composition of matter which is a mixture comprising a finely-divided inorganic pigment suspended in an aqueous vehicle and a sufficient amount of said copolymer material to maintain the viscosity of the mixture at a desired level.

In accordance with the invention, dispersion of an inorganic pigment in an aqueous medium is effected by employing as the dispersing medium a copolymer of the formula

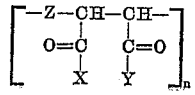

wherein Z is a bivalent alkylene radical of from 2 to 4 carbon atoms, X and Y are radicals selected from the class consisting of —ONH₄ and —NH₂ and $n$ is an integer indicative of the state of polymerization. Generally, $n$ may be from 5 to 1000, and preferably less than 100.

One class of presently useful copolymers includes salts of maleic acid-aliphatic, mono-olefin copolymers with ammonia. Such salts have the formula

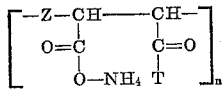

where T is selected from the class consisting of —ONH₄ and —OH. Copolymers having the above formula include the mono-ammonium or diammonium salts of maleic acid-ethylene copolymer, of maleic acid-propylene copolymer, or of maleic acid-1- or 2-butene copolymer.

Another class of presently useful copolymers includes the mono- and diamides of maleic acid-ethylene, propylene or 1- or 2-butene copolymers. This class may be represented by the formula

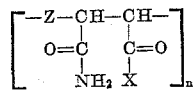

in which Z is an alkylene radical of from 2 to 4 carbon atoms, X is selected from the class consisting of —NH₂ and —OH, and $n$ is an integer indicating the degree of polymerization. As illustrative of copolymers having the above formula may be mentioned the monoamide of maleic acid-ethylene or propylene copolymer and the diamide of maleic acid-ethylene or 2-butene copolymer.

Still another class of the presently useful derivatives of maleic acid-aliphatic mono-olefin copolymers includes the half ammonium salts, half amides of the formula

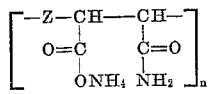

in which Z and $n$ are as herein defined. Representative members of this useful class include the ammonium salt of maleic acid-ethylene, or propylene or 2-butene copolymer mono-amide.

The above presently useful salts, amides, and half salts-half amides of maleic acid-aliphatic, mono-olefin copolymers are known materials which are obtainable in commerce or by methods well known to those skilled in the art. For convenience, however, a résumé of such methods is given herewith.

In practice, the present salts or amides of maleic acid-olefin copolymers are prepared from readily available maleic anhydride-olefin copolymers, for example, as described in the Hanford U.S. Patents 2,378,629 and 2,396,785. Generally, the copolymers are prepared by reacting ethylene, propylene, 1- or 2-butene or mixtures of these olefins with maleic anhydride in the presence of a peroxide catalyst in an aliphatic or aromatic hydrocarbon which is a solvent for the monomers but is a non-solvent for the interpolymer formed. Suitable solvents include benzene, toluene, xylene, chlorinated benzene, hexane, ethylene dichloride and the like. While benzoyl peroxide is the preferred catalyst, other peroxides such as acetyl peroxide, butyryl peroxide, di-tert-butyl peroxide, lauroyl peroxide and the like are all satisfactory since they are soluble in organic solvents. The copolymer contains substantially equimolar quantities of the ethylene residue and the maleic anhydride residue. The properties of the polymer such as molecular weight, for example, may be regulated by proper choice of the catalyst and control of one or more of the variables such as ratio of reactants, temperature, catalyst concentration or inclusion of a polymer chain regulator. The product is obtained in solid form and is easily recovered by filtration, centrifugation or the like. Removal of any residual or adherent solvent may be effected by evaporation using moderate heating.

The maleic anhydride copolymers thus obtained have the formula

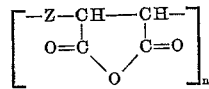

where Z corresponds to an alkylene radical having the carbon content of the olefin monomer which was used and $n$ denotes the degree of polymerization.

Said anhydride copolymers are readily hydrolyzed by heating with water to yield the acid form of the copolymer

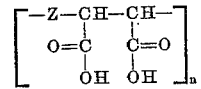

The mono- or diammonium salts may be readily obtained by reacting the copolymer in its anhydride or acid form with the stoichiometric amount of ammonium hydroxide. Whether a mono-salt or a di-salt is formed depends upon whether the quantity of ammonia used is sufficient to react with both carboxy groups or sufficient only for the neutralization of one carboxy group.

Amides are prepared generally by reacting the finely divided maleic anhydride-aliphatic olefin copolymer with ammonia gas at ordinary or elevated temperatures. Half-salts, half-amides are formed by the use of two moles of amine per mole of maleic anhydride copolymer at atmospheric pressure. Heat is generally liberated in the preparation of the half-ammonium salt, half-amide, and it is thus desirable to provide some means for dissipating it so that the product will not be adversely affected by excessively high temperatures (i.e., by fusion or inter-chain reactions such as crosslinking). One effective means for controlling the heat of reaction consists of suspending the solid polymer in an inert organic liquid such as benzene and bubbling ammonia through the slurry.

The half-amide, half-ammonium salts may be converted to the diamides by heating with ammonia at a temperature of from about 50° C. to 150° C. and at super-atmospheric pressure as described in our copending application, Serial No. 699,472, filed November 29, 1957, which issued as Patent No. 2,921,928.

The copolymer dispersing agents of the invention are effective generally with all inorganic pigments. Of the many in existence which can be dispersed in aqueous medium using the thinning agents described herein are ferric oxide, iron blues, red lead, white lead (basic carbonate), white lead (basic sulfate), lead chromate, zinc oxide, zinc chromate, zinc sulfide, lithopone, chromium oxide, titanium dioxide (Anatase), titanium dioxide (Rutile), antimony oxide, cadmium sulfide, lead titanate, and the like. They are also useful with extended pigments such as titanium-barium, titanium-calcium, titanium-magnesium, zinc sulfide-barium, zinc sulfide-calcium, and zinc sulfide-magnesium pigments or with any combinations of pigments used to provide pigments of other than the primary colors such as lead chromate-lead oxide for making lighter shades of chrome orange, and iron blue and lead chromate for making chrome greens.

The aqueous medium may be fresh water alone or it may be an oil-in-water emulsion, i.e., water to which small quantities of oil have been added.

The quantity of dispersing agent to be used depends, of course, on the degree of dispersion desired or, in other words, the consistency or fluidity desired, the particle size of the dispersate, and the concentration of the dispersion. In general, from 0.01% to 2.0% and preferably 0.05% to 2.0% by weight of the dispersing agents of the invention based on the dispersate will give good results. For convenience, whenever the concentration of the dispersing agent is hereinafter given, it will be understood to be based on the weight of the dispersate. The copolymer dispersing agent may be added to the pigment suspension as an aqueous solution or as a solid in powdered form or it may be incorporated as a dry solid with the dry pigment in the grinding or milling operation. Alternatively, the dispersion and mixing may take place simultaneously by intimately mixing the pigment with water and the dispersing agent.

The invention is illustrated in the following examples but these are not to be construed as limiting it in any manner except as it is limited in the appended claims. Viscosimetric measurements have been employed for evaluating dispersing action. The viscosity of the system is measured and the fluidity of the sample is taken as an indication of the relative degree of dispersion based on the commonly accepted conception that for the same concentration of solids under similar conditions, the more fluid is the sample, the more completely dispersed are the suspended particles. The Brookfield viscosimeter was employed at room temperature in obtaining the data given here. Specific viscosities of the anhydride copolymers used in the following examples were determined in dimethylformamide solution at 25° C.

Example 1

An ethylene-maleic anhydride copolymer, characterized by having a specific viscosity of 0.22 as determined in a 1% dimethylformamide solution thereof, was dissolved in water to give a 5% aqueous solution and the copolymer converted to the ammonium salt by passing ammonia into the solution to a pH of 7. The resulting solution of copolymer salt was employed in the following tests.

Into a mechanical mixer there was placed 200 g. of pigment grade titanium dioxide. To this there was added 2.0 g. of said salt solution and 198.0 g. of water. This resulted in a slurry having a 50% by weight concentration of titanium dioxide and a 0.05% by weight concentration of the ammonium salt of the ethylene-maleic anhydride copolymer. After mechanically stirring the slurry at high speed for 5 minutes (stopping at the end of one minute to scrape down the sides of the mixer cup) the mixed slurry was allowed to stand overnight to reach equilibrium. At the end of that time, the viscosity of the slurry, determined with a Brookfield viscosimeter at 12 r.p.m., was found to be about 130 cps. When the above test was repeated except that a concentration of 0.1% of the copolymer salt was used, the viscosity was found to be about 6 cps. In a still another test wherein a 0.5% concentration of the salt was employed, the viscosity was again found to be about 100 cps. When it is considered that a 50% aqueous slurry of the pigment grade titanium dioxide has a viscosity of 8,000 centipoises in the absence of any additive, the thinning effect of the presently used small concentrations of the ammoniated low-molecular weight ethylene-maleic anhydride copolymers is remarkable.

Operating as above but using pigment grade kaolin instead of the titanium dioxide, the Brookfield viscosity of the resulting slurry was found to be 113 cps. at the 0.1% concentration of the copolymer salt. The Brookfield viscosity of a 50% aqueous slurry prepared in the absence of a dispersant, but employing the same kaolin was found to be 8,000 cps. For comparative purposes, the testing procedure, repeated with the same kaolin in the presence of Aerosol OT (dioctyl sulfosuccinate) commerial dispersant, gave a Brookfield viscosity for the resulting slurry of 6,000 at a 0.1% concentration, 3,120 at a 0.2% concentration and 7,000 at a 1.0% concentration of the Aerosol OT. With an alkylated aryl polyether alcohol type of commercial dispersant known to the trade as "Triton X–100," the Brookfield viscosity, employing the same kaolin and the same testing procedure was found to be 8,850 at a 0.1% concentration and 8,350 at a 0.2% concentration of the Triton X–100.

Comparative tests conducted with titanium dioxide employing the pigment grade used above and the same testing procedure but using the commercial dispersant Triton X-100 instead of the present copolymer salt gave a Brookfield viscosity of 5,200 at a 0.1% concentration and 3,900 at a 0.5% concentration of said commercial dispersant.

Example 2

Operating as in Example 1, but employing an ethylene-maleic anhydride copolymer having a specific viscosity of 0.46 as determined in a 1% dimethylformamide solution thereof, the viscosity of a 50% aqueous slurry of pigment grade titanium dioxide was found to be about 5.0 cps. at a 0.05% concentration of the ammoniated copolymer and about 5.0 cps. at a 0.1% concentration.

Operating as above but using pigment grade kaolin instead of the titanium dioxide, the Brookfield viscosity of the resulting slurry was found to be 308 at the 0.1% concentration.

Example 3

Employing the testing procedure of Example 1, there was tested the dispersing efficiency of an ethylene-maleic anhydride copolymer having a specific viscosity of 0.05 in 1% dimethylformamide solution. The copolymer was ammoniated as in Example 1. An aqueous slurry of the pigment grade titanium dioxide containing 50% by weight of the dioxide and 0.075% by weight of said ammoniated copolymer was found to have a viscosity of 575 cps.; at a 0.10% concentration of the ammoniated copolymer the viscosity of the slurry had decreased to 27 cps.

Operating as above but using pigment grade kaolin instead of the titanium dioxide, the Brookfield viscosity of the resulting slurry was found to be 1,320 at the 0.3% concentration.

Example 4

An aqueous solution of ethylene-maleic anhydride copolymer, having a specific viscosity of 1.65 as determined in a 1% dimethylformamide solution thereof, was treated with ammonia to a pH of 7 and the resulting solution of ammonium salt was mixed with water and pigmented titanium dioxide as in Example 1 to give a mixture consisting of 50% the titanium dioxide and 0.05% of the ammoniated copolymer. The Brookfield viscosity of the resulting mixture was found to be 30 cps.

Example 5

A half-amide, half-ammonium salt of an ethylene-maleic anhydride copolymer, having a specific viscosity of 0.51 as determined in a 1.0% dimethylformamide solution thereof, was mixed with water and pigment grade kaolin to give a mixture containing 50% by weight of kaolin and 0.25% of said half-amide, half-salt. The Brookfield viscosity of the slurry obtained by mechanical mixing and subsequent standing overnight was found to be about 200 centipoises.

Example 6

A mixture consisting of 200 lbs. of pigment grade kaolin, 50 lbs. of pigment grade titanium dioxide and 0.5 lb. of the half-amide, half-salt of an ethylene-maleic anhydride copolymer characterized by having a specific viscosity of 0.51 in 1% dimethylformamide solution was stirred rapidly to thorough dispersion and 30 lbs. of coating grade soy bean protein was gradually added thereto as a 20% aqueous solution which had been brought to a pH of 10 by treatment with caustic soda. The "color" thus obtained was employed in a conventional paper coating machine to obtain a finished paper characterized by a uniform, white surface of good opacity and gloss.

Example 7

A coating composition was prepared as follows: A kaolin dispersion was prepared by mechanically agitating 100 lbs. of pigment grade kaolin with 7 gallons of water in the presence of 0.1 lb. of the diammonium salt of an ethylene-maleic anhydride copolymer characterized by a specific viscosity of 0.22 in 1.0% dimethylformamide solution at 25° C. To the resulting dispersion, there was gradually added, with stirring, 10 gallons of a 14% casein solution (12 lb. of casein) which had been buffered to a pH of 9.5 by treatment with ammonia. After thorough mixing, the resulting composition, having an approximate 46% solids content, was used as the "color" in a paper-coating process employing a conventional paper-coating machine at a speed of 10'/sec. Hot air tunnel drying of the coated paper at 150° C. gave a finished paper of very good surface quality.

*Example 8*

This example describes the formulation of a synthetic latex base paint.

A dispersion medium was first prepared by dissolving 2 pounds of the ethylene-maleic anhydride ammonium salt of Example 7 in 150 pounds of water and adding thereto 8 pounds of 400 cps. methyl cellulose, mixing thoroughly, adding 242 pounds of cold water, and finally 10 pounds of the commercial fungicide "Dowicide A" (sodium o-phenyl phenate). A mixture of pigments consisting of 18 pounds of titanium dioxide (rutile), 7 pounds of iron oxide brown, 6 pounds of china clay and 10 pounds of talc was treated with 20.6 pounds of the above dispersion medium to form a paste, and the paste given a loose pass through the mill. The ground paste was then let-down with 18.7 pounds of water and finally 39.5 pounds of a synthetic latex. After thorough blending, the finished product, having a solids volume of 38.4%, a pigment volume of 40.5% and a KU viscosity of 76 was readily applied as a coating to the cement plaster surface to give, upon drying, a smooth, well-adherent finish.

*Example 9*

A paper coating or "color" was prepared by preparing a 50% aqueous dispersion of pigment grade titanium dioxide in the presence of 0.05% by weight of the diammonium salt of an ethylene-maleic anhydride copolymer having a specific viscosity of 0.90 in 1% dimethylformamide solution at 25° C. To the dispersion there was added with vigorous stirring a sufficient quantity of a 5% aqueous methyl cellulose solution to give 16% by weight of the methyl cellulose based on the weight of the titanium dioxide. The "color" thus obtained had a low viscosity at relatively high solids content and was applied with good results to the paper web to be coated in known manner.

The dispersing effect of the present aliphatic olefin-maleic anhydride copolymer salts or amides serves to facilitate a degree of intimate contact of the pigment particles with the film-forming bonding agent which results in a smooth, uniform finish that is unattainable in the absence of said copolymer materials and which is attained by use of other dispersing agents in quantities which not only are substantially greater than those presently employed but which are operative within only very narrow concentration ranges. These are important considerations in industrial operation.

What we claim is:

1. A paper-coating composition comprising casein, water, kaolin, and a dispersing agent which is a half-amide, half-ammonium salt of an ethylene-maleic anhydride copolymer having a molecular weight of less than 13,000, said dispersing agent being present in a quantity of from 0.01% to 2.0% by weight of the kaolin and said casein being present in a quantity of from 10% to 35% by weight of the kaolin, the total solids content of said coating composition being from 20% to 70% by weight of the composition.

2. A coating composition comprising an organic film-forming binding agent, water, a water-insoluble inorganic pigment and a dispersing agent which is the half-ammonium salt, half-amide of ethylene-maleic anhydride copolymer having an average molecular weight of less than 13,000, said dispersing agent being present in a quantity of from 0.01% to 2.0% by weight of the pigment, said film-forming material being present in a quantity of from 10% to 35% by weight of the pigment, and the total solids content of said coating composition being from 20% to 70% by weight of the composition.

References Cited in the file of this patent

UNITED STATES PATENTS

| | | |
|---|---|---|
| 2,542,783 | Seed | Feb. 20, 1951 |
| 2,823,200 | Longley et al. | Feb. 11, 1958 |
| 2,865,877 | Hatton et al. | Dec. 23, 1958 |
| 2,865,878 | Toothill et al. | Dec. 23, 1958 |

FOREIGN PATENTS

| | | |
|---|---|---|
| 201,429 | Australia | Feb. 24, 1956 |
| 758,986 | Great Britain | Oct. 10, 1956 |